No. 890,798. PATENTED JUNE 16, 1908.
S. H. ROBERTS.
HORSESHOE CALK.
APPLICATION FILED MAY 23, 1907.

Witnesses
Ray White,
Harry P. Levlute

Inventor
Samuel H. Roberts,
By Kummler & Kummler
Att'ys

UNITED STATES PATENT OFFICE.

SAMUEL H. ROBERTS, OF JOLIET, ILLINOIS.

HORSESHOE-CALK.

No. 890,798.  Specification of Letters Patent.  Patented June 16, 1908.

Application filed May 23, 1907. Serial No. 375,273.

*To all whom it may concern:*

Be it known that I, SAMUEL H. ROBERTS, a citizen of the United States of America, and a resident of Joliet, county of Will, and State of Illinois, have invented certain new and useful Improvements in Horseshoe-Calks, of which the following is a specification.

Figure 1:
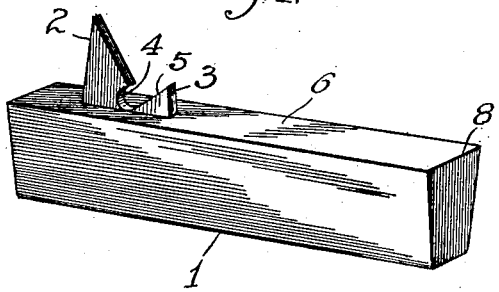
Figure 2:
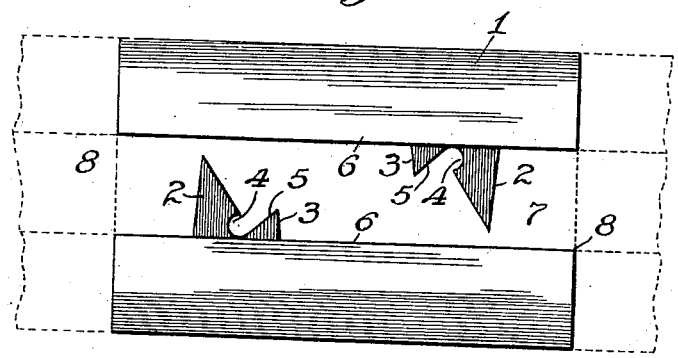

The main objects of this invention are to provide an improved form of horse-shoe calk provided with welding lugs of suitable form to securely engage the metal of a shoe and prevent the calk from becoming loosened during the handling of the shoe prior to welding the calk in position; to provide an improved form of welding lug for horse-shoe calks; and to provide an improved method of manufacturing such horse-shoe calks. These objects are accomplished by the device shown in the accompanying drawings, in which:

Figure 1 is a perspective view of a horse-shoe toe-calk constructed according to this invention; Fig. 2 is a view, indicating by dotted lines the shape of the bar from which the calks are cut and by full lines indicating the relation of a pair of calks to each other in such bar; and Fig. 3 is a transverse section of the bar from which the calks are cut.

In the form shown in the drawings the calk comprises a body 1 of the form which is usual for toe-calks of horse-shoes and having on its upper face a pair of pointed welding lugs 2 and 3 located in the same plane with each other. The lug 2 is undercut in the edge which is adjacent to the lug 3 so as to form a recess 4; and the lug 3 has an inclined face 5 opposite and sloping toward the recess 4 and sufficiently close to the same to cause a part of the metal of the shoe to be forced into the recess 4 when the welding lugs are driven into it. The face 6 of the calk is the face which is welded to the shoe.

Figure 3:
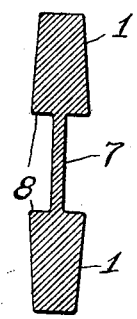

In manufacturing calks according to this invention the metal is first rolled into a bar comprising a pair of parallel body members from which the bodies 1 of the calks are cut, and a connecting web 7, located in the middle plane of said body members, as shown in Figs. 2 and 3. The web is first sheared away by dies of suitable form so as to cut away from the body members all of the metal of the web except the portion which forms the welding lugs indicated by full lines in Fig. 2, the lugs on the two body members being in staggered relation to each other. Then, in the same operation or thereafter, the body parts are cut up to suitable lengths for calks.

The welding lugs on each calk are located close to each other and are both preferably at one side of the middle of the calk.

In applying a calk of this character to a horse-shoe, the shoe is first heated so that the welding lugs of the calk may be readily driven into it. The calk is then placed in position upon the shoe with the face 6 toward the shoe, the calk resting upon the point of the welding lug 2 and the edge 8 of its opposite end. By striking the calk at a point opposite the welding lugs said lugs are driven into the comparatively soft metal of the shoe. As the wedge-shaped lug 3 penetrates the metal of the shoe, it drives a part of said metal into the recess 4 and thereby securely fastens the calk in position and prevents the possibility of its becoming loosened through an additional blow of the hammer or through engagement with the coals or clinkers in the furnace when the shoe is inserted for the purpose of bringing it and the calk to the proper welding heat before welding the calk into position.

What I claim as my invention and desire to secure by Letters Patent, is:

1. A horse-shoe calk comprising a body having a welding lug on one face, said welding lug being undercut at one side, and an inclined surface located opposite the undercut part of said lug and sloping toward said undercut so as to force the metal of the shoe into said undercut during the act of driving the welding lug into the shoe.

2. As an article of manufacture, a horse-shoe calk provided with an undercut and pointed projection adapted to be driven into a horse-shoe, and further provided with an inclined projection having its adjacent side sloping toward said undercut so as to force the metal of the shoe into said undercut when said projections are driven into the shoe.

3. As an article of manufacture, a horse-shoe calk provided with a pair of adjacent projections of less width than that of the calk and adapted to be driven into a horse-shoe, one of said projections being undercut at the side adjacent the other, and said other projection being so shaped as to force the metal of the shoe into said undercut when said projections are driven into the shoe.

4. A horse-shoe calk comprising a body part having on one face two welding lugs, one of said lugs having therein a recess opposed to the other lug and said other lug having an inclined face opposed to said recess and adapted when said lugs are driven into a horse-shoe to cause the metal of the shoe to enter said recess and prevent said lug from becoming loosened.

5. As an article of manufacture, a horse-shoe calk provided with a pair of adjacent projections, one of which is longer than the other, said longer projection being undercut in that side which is adjacent to the other projection, and said other projection being so shaped as to force the metal of a shoe to enter said undercut when said projections are driven into the shoe.

Signed at Chicago this 20th day of May 1907.

SAMUEL H. ROBERTS.

Witnesses:
GERTRUDE L. YORKE,
E. A. RUMMLER.